(12) United States Patent
Singh et al.

(10) Patent No.: US 9,711,797 B2
(45) Date of Patent: Jul. 18, 2017

(54) COATED PARTICLES FOR LITHIUM BATTERY CATHODES

(71) Applicant: Seeo, Inc, Hayward, CA (US)

(72) Inventors: Mohit Singh, Berkeley, CA (US); Hany Basam Eitouni, Oakland, CA (US); Russell Clayton Pratt, Foster City, CA (US); Scott Allen Mullin, San Leandro, CA (US); Xiao-Liang Wang, Fremont, CA (US)

(73) Assignee: Seeo, Inc., Hayward, CA (US)

( * ) Notice: Subject to any disclaimer, the term of this patent is extended or adjusted under 35 U.S.C. 154(b) by 599 days.

(21) Appl. No.: 13/889,335

(22) Filed: May 7, 2013

(65) Prior Publication Data

US 2014/0154572 A1  Jun. 5, 2014

Related U.S. Application Data

(60) Provisional application No. 61/643,346, filed on May 7, 2012.

(51) Int. Cl.
*H01M 4/62* (2006.01)
*H01M 4/52* (2010.01)
(Continued)

(52) U.S. Cl.
CPC ............ *H01M 4/624* (2013.01); *B05D 1/34* (2013.01); *H01M 4/366* (2013.01); *H01M 4/485* (2013.01); *H01M 4/505* (2013.01); *H01M 4/525* (2013.01); *H01M 4/5825* (2013.01); *H01M 4/622* (2013.01); *H01M 4/623* (2013.01); *H01M 10/0525* (2013.01)

(58) Field of Classification Search
USPC ............. 429/208–246; 29/623.1–623.5; 252/182.1, 500
See application file for complete search history.

(56) References Cited

U.S. PATENT DOCUMENTS 7,318,982 B2  1/2008  Gozdz
2002/0034583 A1  3/2002  Jung
(Continued)

FOREIGN PATENT DOCUMENTS

CN  101630729 B  3/2011
KR  10-0373835 B1  2/2003
KR  10-0589307 B1  6/2006

OTHER PUBLICATIONS

Li et al. ("Mixed (electronic and ionic) conductive solid polymer matrix", published 1991, pp. 3043-3050).*
Machine translation of CN101630129.

*Primary Examiner* — Matthew Merkling
(74) *Attorney, Agent, or Firm* — R'Sue Popowich Caron

(57) ABSTRACT

Particles of cathodic materials are coated with polymer to prevent direct contact between the particles and the surrounding electrolyte. The polymers are held in place either by a) growing the polymers from initiators covalently bound to the particle, b) attachment of the already-formed polymers by covalently linking to functional groups attached to the particle, or c) electrostatic interactions resulting from incorporation of cationic or anionic groups in the polymer chain. Carbon or ceramic coatings may first be formed on the surfaces of the particles before the particles are coated with polymer. The polymer coating is both electronically and ionically conductive.

19 Claims, 3 Drawing Sheets

(51) Int. Cl.
  *H01M 4/525*   (2010.01)
  *B05D 1/34*    (2006.01)
  *H01M 4/485*   (2010.01)
  *H01M 4/58*    (2010.01)
  *H01M 4/36*    (2006.01)
  *H01M 4/505*   (2010.01)
  H01M 10/0525   (2010.01)

(56) References Cited

U.S. PATENT DOCUMENTS

2004/0029014 A1   2/2004   Hwang
2011/0003211 A1   1/2011   Hudson
2011/0117432 A1   5/2011   Kay
2011/0281175 A1   11/2011  Hudson \* cited by examiner

COATED PARTICLES FOR LITHIUM BATTERY CATHODES

CROSS-REFERENCE TO RELATED APPLICATIONS

This application claims priority to U.S. Provisional Patent Application 61/643,346, filed May 7, 2012, which is incorporated by reference herein.

STATEMENT OF GOVERNMENT SUPPORT

The invention described and claimed herein was made in part utilizing funds supplied by the U.S. Department of Energy under Contract No. DE-EE0005449. The Government has certain rights in this invention.

BACKGROUND OF THE INVENTION

Field of the Invention

This invention relates generally to secondary lithium batteries, and, more specifically, to materials for use in cathodes of such batteries.

Typical composite cathodes in lithium batteries are composed of several materials such as cathode active materials, electrically-conductive additives, binders, and electrolytes, each of which performs a different function. An efficiently-designed cathode may have porous active material that can communicate electronically with a current collector and also can communicate ionically with an electrolyte that fills the cathode pores. Often the cathode is in the form of particles that may be held together with binders to form a porous structure. Recent research in lithium batteries has led to the development of high energy cathode materials that have higher upper voltage limits and/or higher discharge capacities than do cathode materials that had been available previously. Some examples of such new materials and their properties are shown in Table I below.

Unfortunately, these new active materials have not been "drop-in" replacements in conventional cathode formulations because they can be highly reactive, continuously consuming electrolyte, and they tend to crack during cell cycling, losing electronic contact with the current collector and thus reducing electron flow. The overall result is that batteries in which these materials are used can cycle for an unacceptably short time before they fail. Ceramic coatings, such as $ZrO_2$, have been shown to improve stability by inhibiting particle breakdown and by providing a buffer between the electrolyte and the active particle surface. However, these coatings have not been very successful in practice. They tend to fail in two ways: 1) poor cycle life due to incomplete surface coverage of the particles, and 2) high impedance due to their own ionic or electronic barrier properties.

TABLE I

| Cathode Active Material | Discharge Capacity | Upper Voltage Limit |
|---|---|---|
| $LiCoO_2$ (conventional) | 130 mAh/g | 4.2 V |
| $LiNi_{0.8}Co_{0.15}Al_{0.05}O_2$ | 200 mAh/g | 4.3 V |
| concentration-gradient $LiMO_2$ M = Mn, Co or Ni | 200 mAh/g | 4.4 V |
| layered $Li_2MO_3$—$LiMO_2$ M = Mn, Co or Ni | 280 mAh/g | 4.6 V |

TABLE I-continued

| Cathode Active Material | Discharge Capacity | Upper Voltage Limit |
|---|---|---|
| $LiNi_{0.5}Mn_{1.5}O_4$ spinel | 150 mAh/g | 4.7 V |
| $LiNiPO_4$ | 155 mAh/g | 5 V |

What is needed is a way to use high energy cathode materials so that they no longer break down in the ways described above. One approach is to develop high-quality cathode particle coatings that are stable at high voltages, are electronically and ionically conductive, and form a long-lasting coating on the surface of the cathode particles.

BRIEF DESCRIPTION OF THE DRAWINGS

The foregoing aspects and others will be readily appreciated by the skilled artisan from the following description of illustrative embodiments when read in conjunction with the accompanying drawings.

SUMMARY

Figure 1:
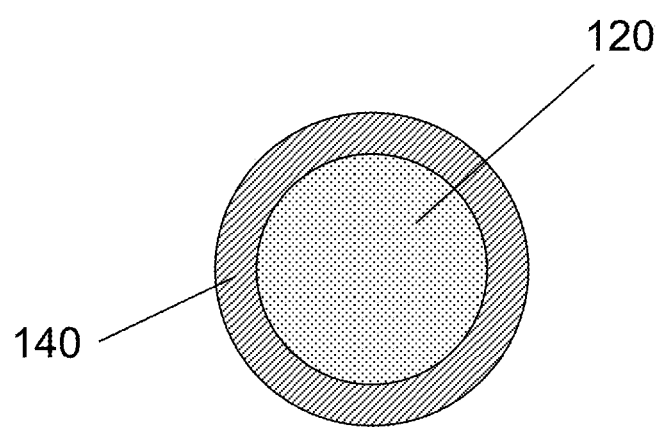
FIG. 1 is a cross-section schematic illustration of a high energy cathode material particle that has a coating, according to an embodiment of the invention.

A material for use in a positive electrode is disclosed. The material is made of at least a positive electrode active material particle and a polymer layer coating the particle. The polymer layer includes a first polymer that is ionically conductive and a second polymer that is electronically conductive. The positive electrode active material can be any of layered $Li_2MO_3$—$LiMO_2$ (M=Mn, Co or Ni), concentration-gradient $LiMO_2$ (M=Mn, Co or Ni), $LiNi_{0.8}Co_{0.15}Al_{0.05}O_2$, and spinel-$LiNi_{0.5}Mn_{1.5}O_4$, $LiNiPO_4$, $LiMn_xFe_{1-x}PO_4$, $LiCoPO_4$, spinel-$LiMn_2O_4$, $LiNi_xCo_yMn_zO_2$ (x+y+z=1), $LiCoO_2$, $LiNiO_2LiMnO_2$, and others.

In one embodiment of the invention, there are one or more additional layers on the surface of the positive electrode active material particle and within the polymer layer coating, that is, there are one or more intervening layers between the particle and the coating. The intervening layer(s) may be any of graphite, carbon nanotubes, amorphous carbon, lithium single-ion conductors, LiPON, LiSICON, $LiCoO_2$, lithium iron phosphate, aluminum, copper, silica, alumina, zirconia, aluminum fluoride, lithium phosphate, and others.

In some arrangements, the polymer layer further comprises lithium salts and/or dopants.

The polymer layer may include one or more polymers. Examples of polymers that may be useful for the layer include polythiophene (PT), PT derivatives, poly(3-hexyl thiophene) (P3HT), polyfluorenes, polyphosphates, other electronically conductive, high-voltage-stable polymers, ionically conductive high-voltage-stable polymers, polyacrylonitrile (PAN), polyphosphates, and PAN derivatives. These materials may be in the form of homopolymers. In one embodiment of the invention, the polymer layer is a block copolymer wherein each block may include any of the materials listed above or other suitable polymers.

DETAILED DESCRIPTION

The preferred embodiments are illustrated in the context of electrodes in lithium electrochemical cells. The skilled artisan will readily appreciate, however, that the materials and methods disclosed herein will have application in a number of other contexts where it is desirable to protect particles from reacting with surrounding materials, particularly where maintaining electronic and ionic conduction is important.

All publications referred to herein are incorporated by reference in their entirety for all purposes as if fully set forth herein.

In this disclosure, the terms "positive electrode" and "cathode" are both used to mean "positive electrode."

New, high-energy cathode materials have attracted considerable interest because of the promise they hold for smaller, lighter, higher energy density battery cells. But they have not become commercialized due to inherent stability issues, including electrolyte breakdown at high voltages and active particle cracking due to volume changes during cell cycling.

A novel approach has been developed that addresses these failure modes, making it possible to exploit the properties of these new cathode materials. Cathode particles are encased in a polymeric, conformal, multifunctional coating that is both electronically and ionically conductive and can contain the particles without the drawbacks seen with $ZrO_2$ coatings as described above. In one arrangement, the polymeric coating has a first polymer that is electronically conductive and a second polymer that is ionically conductive. Thus, there is no direct contact between the cathode particles and the surrounding electrolyte, preventing any chemical reactions between them that might degrade either the cathode particles or the electrolyte.

The novel, new cathode coatings that are described herein can overcome the limitations described above and make it possible to exploit the advantages of high voltage cathode materials using low-cost, scalable methods that are broadly applicable within the scope of lithium battery chemistries.

FIG. 1 shows a cross-section schematic drawing of a particle of cathode active material 120 that has been encased in a protective coating 140, according to an embodiment of the invention. For the purpose of illustration, the particle 120 is shown as spherical, but the particle 120 can also be cubic, rod-shaped, or irregular; the particle 120 can have any shape. A quantity of particles may be monodisperse in size and/or shape or may include a wide range of sizes and/or shapes. In one embodiment of the invention, the particle has a volume between about 0.0025 $\mu m^3$ and 5000 $\mu m^3$, which corresponds to diameters of between about 50 nm and 20 $\mu m$ for a spherical particle. In another embodiment of the invention, the particle has a volume between about 0.0025 $\mu m^3$ and 500 $\mu m^3$, which corresponds to diameters of between about 50 nm and 10 $\mu m$ for a spherical particle. In yet another embodiment of the invention, the particle has a volume between about 0.0025 $\mu m^3$ and 0.5 $\mu m^3$, which corresponds to diameters of between about 50 nm and 1 $\mu m$ for a spherical particle. In one arrangement, the particle 120 can be made of any high capacity cathode active material that has a discharge capacity of about 150 mAh/g or more. In various arrangements, the particle 120 can be made of any high voltage cathode active material that has an upper voltage limit of 4.2 V or 4.3 V or 4.4 V or 4.5 V or 4.6 V or 4.7 V or 4.8 V or 4.9 V or 5.0 V. Some examples of such materials are shown above in Table I.

In one embodiment of the invention, the protective coating 140 is made of one or more polymer materials and is stable to high voltages ($\geq$+3.8 V vs $Li^+/Li$). In another embodiment of the invention, the polymer material is not entirely stable at high voltages ($\geq$+3.8 V vs $Li^+/Li$), but forms stable decomposition products that remain adjacent to the particle 120, and act as a protective layer, providing the same function as the initial protective polymer coating 140. The polymer layer 140 is both ionically and electronically conductive. In one arrangement, the polymer layer 140 is between about 1 nm and 1000 nm thick. In another arrangement, the polymer layer 140 is between about 1 nm and 500 nm thick. In another arrangement, the polymer layer 140 is between about 1 nm and 100 nm thick. In yet another arrangement, the polymer layer 140 is between about 1 nm and 5 nm thick.

In one embodiment of the invention, polymer molecules attach to the particle at a small number of sites, but the polymer molecules grow and expand to provide a protective coating over some or all of the particle surface. In one embodiment of the invention, the protective coating 140 covers the surface of the particle 120 entirely. In another embodiment of the invention, the protective coating 140 covers 95% of the surface of the particle 120. In yet another embodiment of the invention, the protective coating 140 covers 90% of the surface of the particle 120. In yet another embodiment of the invention, the protective coating 140 covers 80% of the surface of the particle 120.

The protective coating 140 conforms to the shape of the particle 120 and is attached to the particle, that is, there are no significant gaps in the adhesion of the coating 140 to the particle. The coating 140 maintains good electronic and ionic communication with the particle 120 throughout many battery charge/discharge cycles. There may be expansion and contraction of the particle 120 and the coating 140 as the battery cycles, yet the coating 140 does not delaminate or lose contact with the particle 120.

Figure 2:
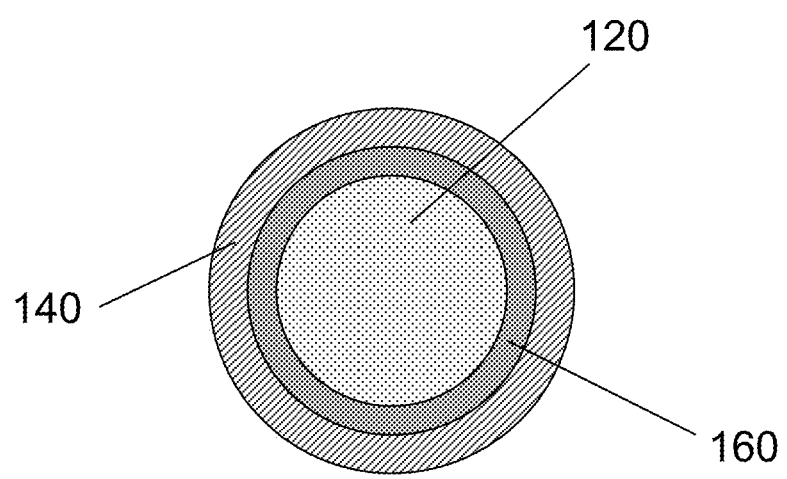
FIG. 2 is a cross-section schematic illustration of a high energy cathode material particle that has a coating and an intermediate layer, according to another embodiment of the invention.

In one embodiment of the invention, there is an intervening layer 160 between the particle 120 and the protective coating 140, as shown in the cross-section schematic drawing in FIG. 2. The intervening layer 160 can be useful in ensuring good bonding between the particle 120 and the protective coating 140 and in preventing delamination during cycling. The intervening layer 160 may provide good electronic and/or ionic conductivity. The intervening layer 160 may be more stable against the protective coating 140 than the particle 120 would be, especially at higher voltages, thus "buffering" the coating 140 from the active material particle 120. The intervening layer 160 can also be thought of as a surface layer on the positive electrode particle whose composition is different from the composition of the particle and over which the protective coating 140 can be coated.

In some arrangements, a carbon or a ceramic material is used for the intervening layer 160. Other examples of intervening layer materials include, but are not limited to graphite, carbon nanotubes, amorphous carbon, lithium single-ion conductors, such as LiPON and LiSICON, $LiCoO_2$, lithium iron phosphate, aluminum, copper, silicon, silica, alumina, zirconia, aluminum fluoride, and lithium phosphate. The intervening layer 160 may be in the form of a continuous or semi-continuous solid layer or in the form of a somewhat porous layer, such as would result from coating with nanoparticles. The particle 120 is coated with the intervening layer 160, and then the protective coating 140 is attached to the intervening layer 160. The intervening layer 160 is both ionically and electronically conductive to ensure that there is no impediment to the flow of ions and electrons into and out of the cathode particle 120. In one arrangement, the intervening layer 160 is between 1 and 25 nm thick. In another arrangement, the intervening layer 160 is between 1 and 15 nm thick. In yet another arrangement, the intervening layer 160 is between 1 and 10 nm thick.

In one embodiment of the invention, the polymer material for the protective coating 140 contains one or more of polythiophene (PT), PT derivatives, such as poly(3-hexyl thiophene) (P3HT), polyfluorenes, polyphosphates, other electronically conductive, high-voltage-stable polymers, ionically conductive high-voltage-stable polymers, such as polyacrylonitrile (PAN), polyphosphates, or PAN derivatives. It can be useful to use a blend of polymers as some may provide only ionic conduction and others may provide only electronic conduction. Thus the blend can provide both ionic and electronic conduction.

In another embodiment of the invention, the polymer material for the protective coating 140 is a diblock or triblock copolymer. In one arrangement, the block copolymer has a first block that is electronically conductive. The first block can be any of polythiophene (PT), PT derivatives, such as poly(3-hexyl thiophene) (P3HT), polyfluorenes, polyphosphates, or other electronically conductive, high-voltage-stable polymers. The block copolymer can have a second block that is ionically conductive such as polyacrylonitrile (PAN), polyphosphates, PAN derivatives, copolymers, and other high voltage stable ionically conductive polymers. In other arrangements the first block provides ionic and electronic conduction and the second block provides mechanical stability which may be useful for ease of processing and/or for providing isolation between the active material particle 120 and the protective coating 140. The first block and the second block are bonded together covalently.

In some arrangements, the block copolymer is a triblock copolymer and it has a third block that provides more of the same (e.g., ABA or BAB type block copolymers) or additional desirable properties (e.g., ABC or ACB type block copolymers) to the coating 140. The third block may have properties such as desirable catalytic activity, adhesion for helping to bind the protective coating to the active material particle, or unique electrochemical properties. For example, if the third block may became conductive or insulating in certain voltage ranges to prevent overcharge or over-discharge. Examples of third blocks include, but are not limited to polystyrene, polyvinylalcohol, polyepichlorohydrin, polyvinylidene difluoride, polyethers, polyethyleneoxide, fluoropolymers, polyacrylates, polymethacrylates, polysiloxanes, polyurethanes, polyelectrolytes, and polyphosphorus esters.

The protective layer can be formed in a variety of ways. In one embodiment of the invention, the particles are coated simply by using solution processing techniques, such as dip coating. In another embodiment of the invention, initiators (molecules that can initiate polymer growth) are first coated or chemically attached onto the particle or onto the intervening layer and then the polymer protective layer is grown outward from the initiators (grafting from). In another embodiment of the invention, the polymer material is formed first and then it is attached to the particle or to the intervening layer by covalently linking to functional groups that are inherently part of the particle's surface, such as surface oxides, or to functional groups that have been coated onto the particle (grafting to). In yet another embodiment of the invention, the polymer material is formed with cationic or anionic groups incorporated into the polymer chains and then the polymer attaches to the particle or the intervening layer through electrostatic interactions with charges on the particle or intervening layer surface. In yet another embodiment of the invention, the polymer material is formed first and then attaches to the particle through Van der Waals forces, hydrogen bonds, or other physical interactions. The method of forming the protective layer may be dictated by the polymer(s) used. For example, PT is a good electron conductor, but it is not easy to process because it is not very soluble in common solvents. Generally this makes PT too difficult to use for many battery applications. But, when PT is grown from the particle or intervening layer surface, it forms a film that is very well adhered to the surface.

In one embodiment of the invention, the cathode materials described herein are used to make a cathode for a lithium battery cell. The coated cathode particles are combined with binder and electronically conductive particles, such as carbon, to form a porous cathode layer. A separator layer, such as Celgard® is positioned onto the cathode layer, and an anode layer, such as graphite, silicon, lithium titanate, or lithium metal, is placed over the separator to form a stack. The stack is placed into a sealed container and liquid electrolyte is added to form a cell.

Figure 3:
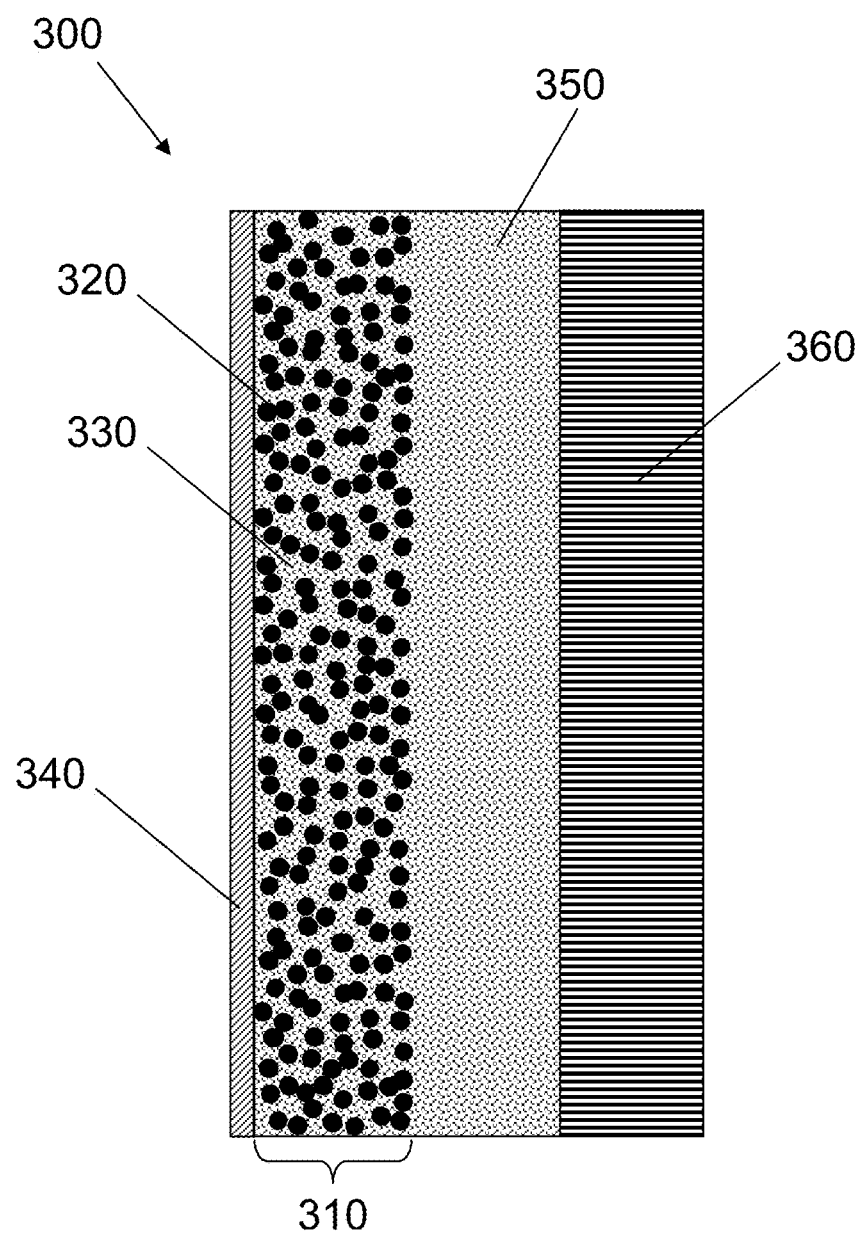
FIG. 3 is a cross-sectional schematic drawing of an electrochemical cell with a positive electrode whose active material particles have a coating, a current collector, a negative electrode, and an electrolyte, according to an embodiment of the invention.

FIG. 3 is a cross-sectional schematic drawing of an electrochemical cell 300 with a positive electrode 310 whose active material particles 320 include a protective polymer layer, which includes both an ionically conductive polymer and an electronically conductive polymer, and optionally an intervening layer as described above, according to an embodiment of the invention. The positive electrode 310 may also contains small, electronically-conductive particles (not shown), such as carbon black and binder particles (not shown). There is a current collector 340 adjacent to and in electronic communication with the positive electrode 310. There is a negative electrode 360 that can be a metal, such as lithium, or some other material that can absorb and release Li ions, such as graphite, silicon or tin. There may also be a negative electrode current collector (not shown) adjacent to and in electronic communication with the negative electrode 360. There is an electrolyte 350 between the positive electrode 310 and the negative electrode 360. There is also an electrolyte 330 within the positive electrode 310.

The electrolytes 330, 350 may be liquid or solid electrolytes, or a combination of both. The electrolytes 330, 350 may be the same electrolyte or they may be different electrolytes. When the electrolytes are liquid, it is likely that the electrolyte 330 and the electrolyte 350 are the same. When electrolyte 350 is liquid, it is used with a separator such as Celgard®. Exemplary liquid electrolytes include ethylene carbonate, dimethyl carbonate, propylene carbonate or other carbonate mixtures containing a lithium salt such as $LiPF_6$. A solid polymer electrolyte can be a polymer, a copolymer, or a blend thereof containing a dissolved salt such as LiTFSI. A solid polymer electrolyte can be a block copolymer electrolyte.

We claim:
1. A material for use in a positive electrode, comprising:
   a particle comprising positive electrode active material; and
   a polymer layer coating the particle;
   wherein the polymer layer comprises a block copolymer whose first blocks are first polymers that are ionically conductive and whose second blocks are second polymers that are electronically conductive; and wherein the first polymers comprise one or more selected from the group consisting of polyphosphates, polyacrylonitrile (PAN), and PAN derivatives.

2. The material of claim 1 wherein the positive electrode active material is selected from the group consisting of layered $Li_2MO_3$—$LiMO_2$ (M=Mn, Co or Ni), concentration-gradient $LiMO_2$ (M=Mn, Co or Ni), $LiNi_{0.8}Co_{0.15}Al_{0.05}O_2$, and spinel-$LiNi_{0.5}Mn_{1.5}O_4$, $LiNiPO_4$, $LiMn_xFe_{1-x}PO_4$, $LiCoPO_4$, spinel-$LiMn_2O_4$, $LiNi_xCo_yMn_zO_2$ (x+y+z=1), $LiCoO_2$, $LiNiO_2$ and $LiMnO_2$.

3. The material of claim 1, wherein the material further comprises one or more intervening layer(s) positioned between the positive electrode particle and the polymer layer.

4. The material of claim 3 wherein the intervening layer(s) comprise one or more selected from the group consisting of graphite, carbon nanotubes, amorphous carbon, lithium single-ion conductors, LiPON, LiSICON, $LiCoO_2$, lithium iron phosphate, aluminum, copper, silica, alumina, zirconia, aluminum fluoride, and lithium phosphate.

5. The material of claim 1 wherein the polymer layer further comprises lithium salts and/or dopants.

6. The material of claim 1 wherein the second polymer comprises one or more selected from the group consisting of polythiophene (PT), PT derivatives, poly(3-hexyl thiophene) (P3HT), polyfluorenes, and polyphosphates.

7. The material of claim 1 wherein the polymer layer comprises a diblock or triblock copolymer whose first blocks are the first polymers and comprise one or more selected from the group consisting of polyacrylonitrile (PAN), polyphosphates, and PAN derivatives.

8. The material of claim 7 wherein the polymer layer comprises a diblock or triblock copolymer whose second blocks are the second polymers and are one or more selected from the group consisting of polythiophene (PT), PT derivatives, poly(3-hexyl thiophene (P3HT)), polyfluorenes, and polyphosphates.

9. The material of claim 8 wherein the polymer layer comprises a triblock copolymer whose third blocks are selected from the group consisting of polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, fluorocarbons, polyvinylidene fluoride, and copolymers that contain styrene, methacrylate, and/or vinylpyridine.

10. The material of claim 1 wherein the polymer layer is stable to voltages more than +3.8 Volts vs $Li^+$/Li.

11. The material of claim 1 wherein the polymer layer reacts to form stable decomposition products at voltages more than +3.8 Volts vs $Li^+$/Li.

12. The material of claim 1 wherein the polymer layer coats at least 95% of the particle.

13. A method of applying a polymer coating to a particle, comprising:
providing a particle comprising positive electrode active material; and
initiating first polymer growth and second polymer growth from active sites on the particle surface, the first polymer being ionically conductive and the second polymer being electronically conductive;
wherein the first polymer and the second polymer form a block copolymer; and
wherein the first polymer comprises one or more selected from the group consisting of polyphosphates, polyacrylonitrile (PAN), and PAN derivatives.

14. The method of claim 13 wherein the positive electrode particle further comprises a surface layer whose composition is different from the composition of the particle.

15. A battery cell, comprising:
a positive electrode comprising a first electrolyte and a positive electrode material comprising:
a particle comprising positive electrode active material;
a polymer layer coating the particle;
wherein the polymer layer comprises a block copolymer whose first blocks are first polymers that are ionically conductive and whose second blocks are second polymers that are electronically conductive;
wherein the first polymers comprise one or more selected from the group consisting of polyphosphates, polyacrylonitrile (PAN), and PAN derivatives,
a negative electrode comprising graphite and/or Li metal;
a second electrolyte between the positive electrode and the negative electrode, the second electrolyte providing ionic communication and separation between the positive electrode and the negative electrode.

16. The battery cell of claim 15 wherein the first electrolyte and the second electrolyte are the same.

17. The battery cell of claim 15 wherein the first electrolyte and/or the second electrolyte are liquid electrolytes.

18. The battery cell of claim 15 wherein the first electrolyte and/or the second electrolyte are solid polymer electrolytes.

19. A material for use in a positive electrode, comprising:
a particle comprising positive electrode active material; and
a polymer layer coating the particle;
wherein the polymer layer comprises a block copolymer whose first blocks are polyacrylonitrile and whose second blocks are polythiophene.

* * * * *